United States Patent [19]
Trubenbach

[11] Patent Number: 6,154,958
[45] Date of Patent: Dec. 5, 2000

[54] METHOD OF MAKING PISTON RINGS

[75] Inventor: Werner Trubenbach, Obergriesbach, Germany

[73] Assignee: Federal-Mogul Burscheid GmbH, Burscheid, Germany

[21] Appl. No.: 09/263,503

[22] Filed: Mar. 8, 1999

[30] Foreign Application Priority Data

Mar. 6, 1998 [DE] Germany .................. 198 09 659

[51] Int. Cl.[7] .................................................. B23P 15/06
[52] U.S. Cl. ........................ 29/888.074; 29/888.075
[58] Field of Search ................ 29/888.074, 888.075; 427/455, 456

[56] References Cited

U.S. PATENT DOCUMENTS

| | | | |
|---|---|---|---|
| 3,133,341 | 5/1964 | Marien | 29/888.074 |
| 3,794,334 | 2/1974 | Prasse et al. | 29/888.074 |
| 3,824,662 | 7/1974 | Minegishi | 29/888.074 |
| 4,828,655 | 5/1989 | Wang et al. | 427/38 |
| 5,358,753 | 10/1994 | Rao et al. | 427/451 |
| 5,461,776 | 10/1995 | Wood | 29/888.074 |
| 5,516,560 | 5/1996 | Harayama et al. | 29/888.074 |
| 5,614,022 | 3/1997 | Vatavuk et al. | 427/456 |
| 5,743,012 | 4/1998 | Adams et al. | 29/888.074 |

*Primary Examiner*—Irene Cuda
*Attorney, Agent, or Firm*—Venable; Gabor J. Kelemen

[57] ABSTRACT

A method of making piston rings includes the following steps: forming a base body on a mandrel by thermally spraying a metal on the mandrel; applying a low-friction coating to the base body; removing the base body from the mandrel; and cutting rings from the base body.

13 Claims, 1 Drawing Sheet

METHOD OF MAKING PISTON RINGS

CROSS REFERENCE TO RELATED APPLICATION

This application claims the priority of German Application No. 198 09 659.3 filed Mar. 6, 1998, which is incorporated herein by reference.

BACKGROUND OF THE INVENTION

This invention relates to a method of making piston rings, particularly for internal-combustion engines, by cutting individual rings from out-of-round metal sleeves.

Piston rings for internal-combustion engines have been manufactured with widely varying methods dependent on the eventual use. Compression piston rings or oil scraping rings are generally made of cast iron or steel. Dependent upon the expected stress on the piston ring, special alloys with suitable wear resistance, elasticity, strength and temperature resistance have been used. The piston rings are cast in an individual or a stacked casting process, or cylindrical or out-of-round sleeves are cast from which the individual rings are cut.

The sleeves are manufactured in various ways. With a centrifugal casting process only cylindrical sleeves may be made. From the sleeves individual rings are cut which pass through a number of treating stations until they reach their finished condition. After cutting open the rings they have to be submitted to complex thermal and/or mechanical working in such a manner that the rings obtain the required internal stress to ensure that when placed in the engine cylinder, they lie against the cylinder wall with a radially outwardly oriented tension. Sleeves made by a sand casting process have the disadvantage of high manufacturing costs because a preparation of the sand mold, relatively long dwelling periods in the mold and a subsequent cleaning of the cast pieces are required for further machining.

For avoiding the above-outlined disadvantages, according to German Patent No. 3,623,122 the sleeves are manufactured in a continuous casting process. Sleeves made in this manner excel in their fine grained, shrinkage cavity-free structure. These sleeves too, however, have to be submitted to various stations for further processing. In one machining station the individual rings are severed from the sleeve. Thereafter the rings are, in a suitably oriented manner, clamped together to form a stack and are cut open. The rings may be subsequently tensioned on a mandrel in a circular configuration and in a further station the rings are provided with a low-friction, wear-resistant coating on their outer circumferential surface.

German Offenlegungsschrift (application published without examination) 3,144,335 discloses a method of making a wear-resistant layer on the slide faces of piston rings. The individual rings are clamped together on a mandrel as a stack and are coated with a thermally sprayed layer. The thus-coated, mandrel-supported rings are thereafter advanced to a further processing station in which the individual rings are separated from one another. Thus, a substantial number of processing steps have to be performed which render the manufacture of the piston rings expensive.

SUMMARY OF THE INVENTION

It is an object of the invention to provide an improved method of the above-outlined type in which rings may be severed from the sleeve in a coated state.

This object and others to become apparent as the specification progresses, are accomplished by the invention, according to which, briefly stated, the method of making piston rings includes the following steps: forming a base body on a mandrel by thermally spraying a metal on the mandrel; applying a low-friction coating to the base body; removing the base body from the mandrel; and cutting rings from the base body.

For performing the process according to the invention a mandrel is used which has an outer circumference corresponding to the inner circumference of the piston rings to be made. The mandrel may have a desired cross-sectional shape, that is, for the method according to the invention, mandrels having a cylindrical or an out-of-round cross-sectional shape may be used. Any spraying process may be used in principle as a thermal spraying process. A flame spraying process using commercially available metal spray materials is preferred. The selection of such material depends on the particular use of the piston ring. For the base ring body, materials with suitable properties as concerns strengths, coefficient of expansion (bimetal ring) and elasticity are used, while for the selection of the low-friction layer criteria relating to the properties of engine run, such as wear resistance and resistance to develop burn traces are decisive.

The invention makes possible to manufacture piston rings with different wall thicknesses, axial heights and properties and thus may be adapted to the particular engine type without involving additional manufacturing costs, such as making casting forms. Since in a processing station the base body as well as the low-friction layer may be made in the same process, the manufacturing costs are significantly reduced.

DESCRIPTION OF THE PREFERRED EMBODIMENT

Figure 1:
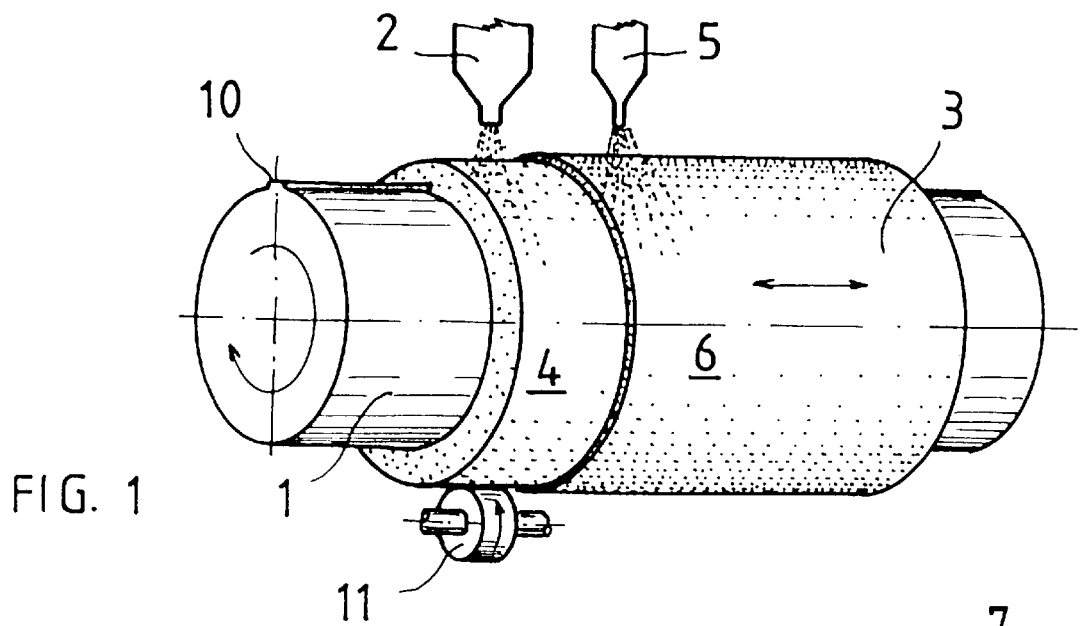
FIG. 1 is a perspective view illustrating the manufacture of a piston ring sleeve according to the invention.

FIG. 1 shows an out-of-round mandrel 1 made, for example of steel. A marking 10 constituted by a ridge extends axially on the outer face of the mandrel 1 to indicate the intended location of the ring split.

By means of a thermal spraying process, an iron-based powder is applied from a nozzle 2 to the surface of the mandrel 1, while axially moving the nozzle 2 and the mandrel 1 relatively to one another. The powder applied to the mandrel 1 may be densified by a roller arrangement 11 immediately or after application. The powder exhibits chrome steel or carbon steel with 13% Cr or O, 8% C.

The base body 4 of the piston ring obtained in this manner is, without removing it from the mandrel 1, sprayed from another nozzle 5, to form a low-friction layer 6 which may be, for example, molybdenum or a molybdenum alloy.

Figure 2:
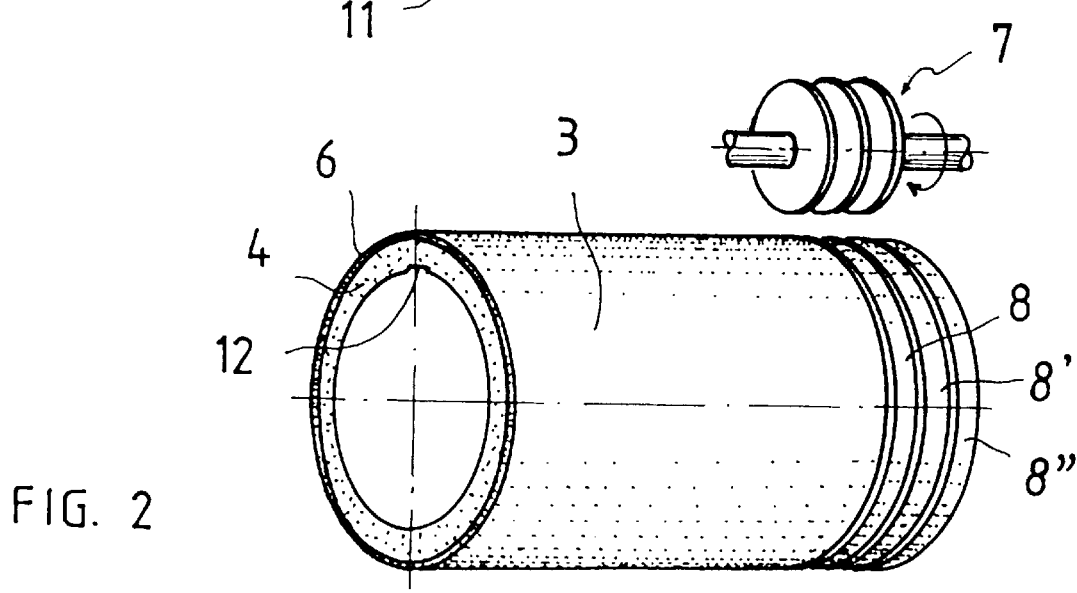
FIG. 2 is a perspective view illustrating the severing of rings from the sleeve.

Thereafter the sleeve 3 is removed from the mandrel 1 and introduced into a severing tool 7 as shown in FIG. 2. The severing tool 7 which may be a high-speed abrasive cutter, slices individual piston rings 8, 8', 8" from the sleeve 3. The individual piston rings 8, 8', 8" have a ring split indicating marking 12 made by the elevated marking 10 on the mandrel 1 so that the rings may be gathered to form a stack and readily oriented according to the marking 12 and thereafter cut through at the marking 12.

Figure 3:
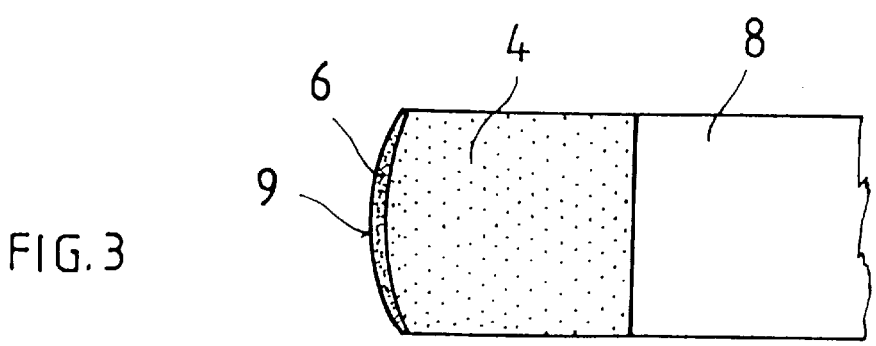
FIG. 3 is a sectional elevational view of a piston ring made according to the invention.

As shown in FIG. 3, the piston rings 8, 8', 8" may have a rounded cross-sectional outline 9 obtained by grinding by means of a non-illustrated tool before applying the low-friction layer 6 to the upper surface of the base body 4.

Before applying the low-friction layer 6, the base body 4 may be heat-treated to remove internal stresses. All these processes are performed on the integral sleeve while it is supported on the mandrel 1.

It will be understood that the above description of the present invention is susceptible to various modifications, changes and adaptations, and the same are intended to be comprehended within the meaning and range of equivalents of the appended claims.

What is claimed is:

1. A method of making piston rings comprising the following steps:

(a) thermally spraying a metal on said mandrel for forming a base body thereon;

(b) applying a low-friction coating to said base body;

(c) removing said base body from said mandrel; and (d) cutting rings from said base body.

2. The method as defined in claim 1, wherein step (a) comprises the step of providing an intended ring split-indicating marking along an axial length of said base body.

3. The method as defined in claim 2, wherein said step of providing an intended ring split indicating marking is effected by a ridge carried on an outer face of said mandrel.

4. The method as defined in claim 1, wherein step (b) comprises the step of thermally spraying a metal.

5. The method as defined in claim 1, wherein said low-friction layer applied in step (b) is selected from the group consisting of molybdenum and an alloy thereof.

6. The method as defined in claim 1, further comprising the step of densifying said base body before step (b).

7. The method as defined in claim 6, wherein the densifying step comprises the step of passing a roller on an outer surface of said base body.

8. The method as defined in claim 1, further comprising the step of grinding an outer surface of said base body before step (b) for obtaining a desired cross-sectional outline of the piston rings.

9. The method as defined in claim 1, further comprising the step of heat-treating said base body but before step (b) for removing internal stresses therefrom.

10. The method as defined in claim 1, wherein step (d) comprises the step of cutting rings from said sleeve by a high-speed abrasive cutting process.

11. The method as defined in claim 1, wherein step (a) comprises the step of forming said base body such as to have an out-of-round circumferential outline.

12. The method as defined in claim 1, wherein step (a) comprises the step of forming said base body such as to have an oval circumferential outline.

13. The method as defined in claim 1, wherein said metal is iron-based.

* * * * *